United States Patent [19]

Carter

[11] Patent Number: 4,774,745

[45] Date of Patent: Oct. 4, 1988

[54] METHOD OF PRODUCING FRAGMENTATION PATTERN IN MILITARY PROJECTILES

[75] Inventor: Harry R. Carter, Moscow, Pa.

[73] Assignee: Carter Research and Development Technological Services Incorporated, Moscow, Pa.

[21] Appl. No.: 929,828

[22] Filed: Nov. 13, 1986

[51] Int. Cl.⁴ .............................................. B21K 21/06
[52] U.S. Cl. ...................................... 29/1.21; 29/1.2

[58] Field of Search ................ 29/1.2, 1.21, 1.22, 29/1.23; 102/491–495, 506, 473, 20.3, 20.5; 172/379

[56] References Cited

U.S. PATENT DOCUMENTS

| 922,585 | 5/1909 | Hooker | 29/1.21 X |
| 3,590,451 | 7/1971 | Dessart | 29/1.21 |

Primary Examiner—Timothy V. Eley
Attorney, Agent, or Firm—David A. Tamburro

[57] ABSTRACT

A method of producing a uniform, consistent, and predictable fragmentation grid pattern within a military projectile.

6 Claims, 4 Drawing Sheets

4,774,745

METHOD OF PRODUCING FRAGMENTATION PATTERN IN MILITARY PROJECTILES

BACKGROUND OF THE INVENTION

This invention relates generally to methods for manufacturing a military projectile having a fragmentation pattern in its inner wall, and more specifically to a novel method for producing a uniform, consistent, and predictable fragmentation pattern within a military projectile.

Since the invention of the first explosive military projectiles in the early 1800's, intensive and continuous development work has been directed towards improving the effectiveness of the projectiles by controlled fragmentation. Various methods and designs have been suggested, and typical proposals are shown in U.S. Pat. Nos. 4,327,643; 4,068,590; 3,757,693; and 3,566,794. Despite the myriad efforts and large amounts of money spent on this objective, no effective, practical, and economical system has been commercially developed to reliably produce a uniform and consistent fragmentation pattern within an explosive projectile.

One particular projectile which is currently produced in large volume with an internal fragmentation pattern is the M42 grenade or submissile, with a plurality of these grenades being delivered to a target by way of an M483A1 ICM projectile. However, the current prior art method by which the fragmentation pattern is provided in the M42 grenade is unsatisfactory, since the fragmentation pattern in the finished grenade body is deformed and distorted. Consequently, break-up of the grenade body is erratic and unpredictable.

Clearly, the need exists for an effective and economical method of forming a uniform, consistent, and predictable fragmentation grid pattern in an explosive projectile. As to the M42 grenade, there is a specific need for such a method which can be readily introduced into current production lines without necessitating significant physical equipment changes in the line and without interrupting production schedules.

OBJECTS OF THE INVENTION

Accordingly, the primary object of this invention resides in the provision of a novel method for forming a uniform, consistent, and predictable fragmentation grid pattern in the body of an explosive projectile.

Another object of the invention resides in the provision of the above novel method which can be readily incorporated into existing production lines without interrupting production schedules.

Still another object of the invention resides in the provision of the above novel method, wherein the fragmentation grid pattern is formed in the body of the projectile after the blank drawing operations.

A further object of the invention resides in the provision of the above novel method, wherein the fragmentation grid pattern is provided by simultaneously scoring a plurality of straight grid lines in the projectile body by way of a fluted punch and then scoring a plurality of transverse or circumferential grid lines to establish the desired intersecting grid pattern.

Another object of the invention resides in the provision of the above novel method and its application to the formation of a fragmentation grid pattern within various type ogival projectiles including artillery shells, mortar shells, bombs, missiles, submissiles, warheads, etc.

Other objects and advantages of the invention will become apparent upon reading the following detailed description of the invention with reference to the accompanying drawings wherein like numerals indicate like elements.

DETAILED DESCRIPTION OF THE INVENTION

Figures 1, 2:
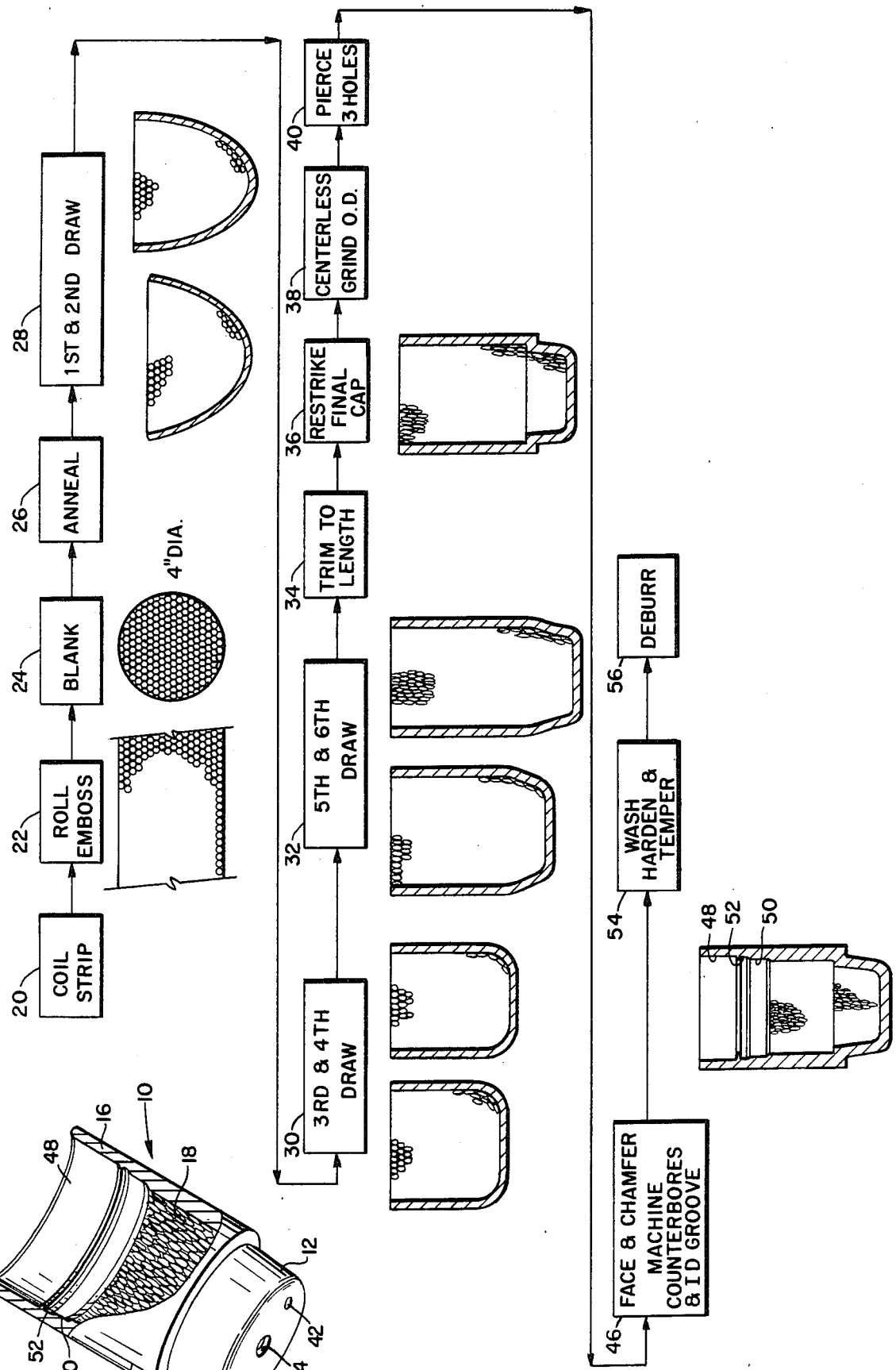
FIG. 1 is a fragmentary perspective view of the body of an M42 grenade manufactured by the most common current prior art method.
FIG. 2 is a block diagram illustrating the current prior art method by which the grenade body of FIG. 1 is manufactured.

Referring now to the drawings, the method of the invention will be described specifically with respect to the manufacture of an M42 grenade. However, it is to be understood that the method applies to the production of all projectiles.

The prior art grenade of FIG. 1 includes a hollow body structure 10 of predetermined configuration having a closed nose section 12, an intermediate cylindrical section 14, and an open rear or tail section 16. In the finished grenade body the internal wall surfaces of sections 12 and 14 are provided with a fragmentation grid pattern 18. However, the finished pattern is elongated, deformed and distorted because of the manner in which it is made.

In the prior art method of FIG. 2, a flat metal strip is fed from a coil 20 through a roll embossing station 22 where a uniform fragmentation grid pattern is embossed on the strip. The strip then passes through a blanking station 24 where it is cut into flat circular blanks 4" in diameter, with the blanks then being fed through an annealing station 26 to relieve high stresses developed in the metal during the embossing operation. The embossed blank then is passed through a series of six drawing operations at stations 28, 30, and 32 where the material is stretched and displaced into a hollow body of predetermined configuration having a closed nose end and an open tail end. Following the sixth draw the tail end is trimmed at station 34 to a predetermined length in preparation for a final restrike punch operation 36 where the final nose and body configuration are established. Note that the internal wall or bore of the body following the sixth draw and restrike operations is straight and cylindrical. The body then passes through a grinding station 38 which grinds the outside diameter and a punch station 40 where holes 42 and 44 are pierced on the nose to subsequently mount a fuse and detonator assembly. The body then passes to a six-spindle machining station 46 where two counterbores 48 and 50 and an internal groove 52 are machined in the tail or open end of the body. In addition the open end is faced to predetermined length and chamfered. Counterbores 48, 50 and groove 52 are provided to accept and retain a shaped charge (copper cone). The body is then heat treated at station 54, deburred at station 56 and properly packaged in readiness for subsequent loading.

It is to be understood that only the significant forming and machining steps are illustrated in FIG. 2, and that in the actual production operation other steps such as washing, lubricating, inspecting, etc. are included.

As discussed above with respect to FIG. 1, the fragmentation pattern 18 in the finished body is deformed and distorted. This occurs because the metal strip and the blank are embossed prior to the drawing operations. As the metal is stretched and displaced under heavy load during the drawing and restrike operations, the fragmentation pattern is elongated, compressed, distorted, and partially fused, and the ultimate breakup is erratic and unpredictable.

Figure 3:
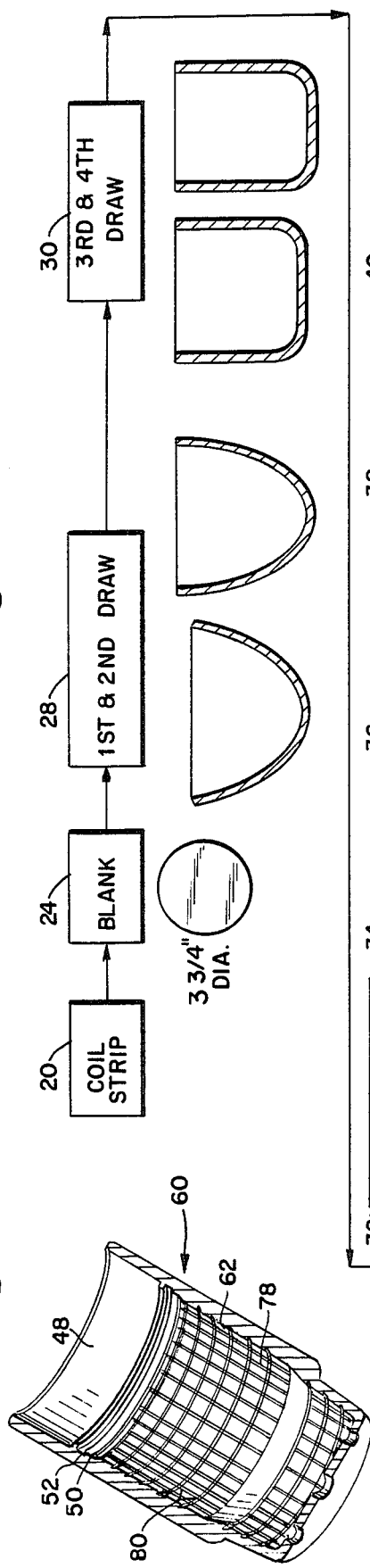
FIG. 3 is a fragmentary perspective view of the body of an M42 grenade produced by the novel method of the invention.
Figure 4:
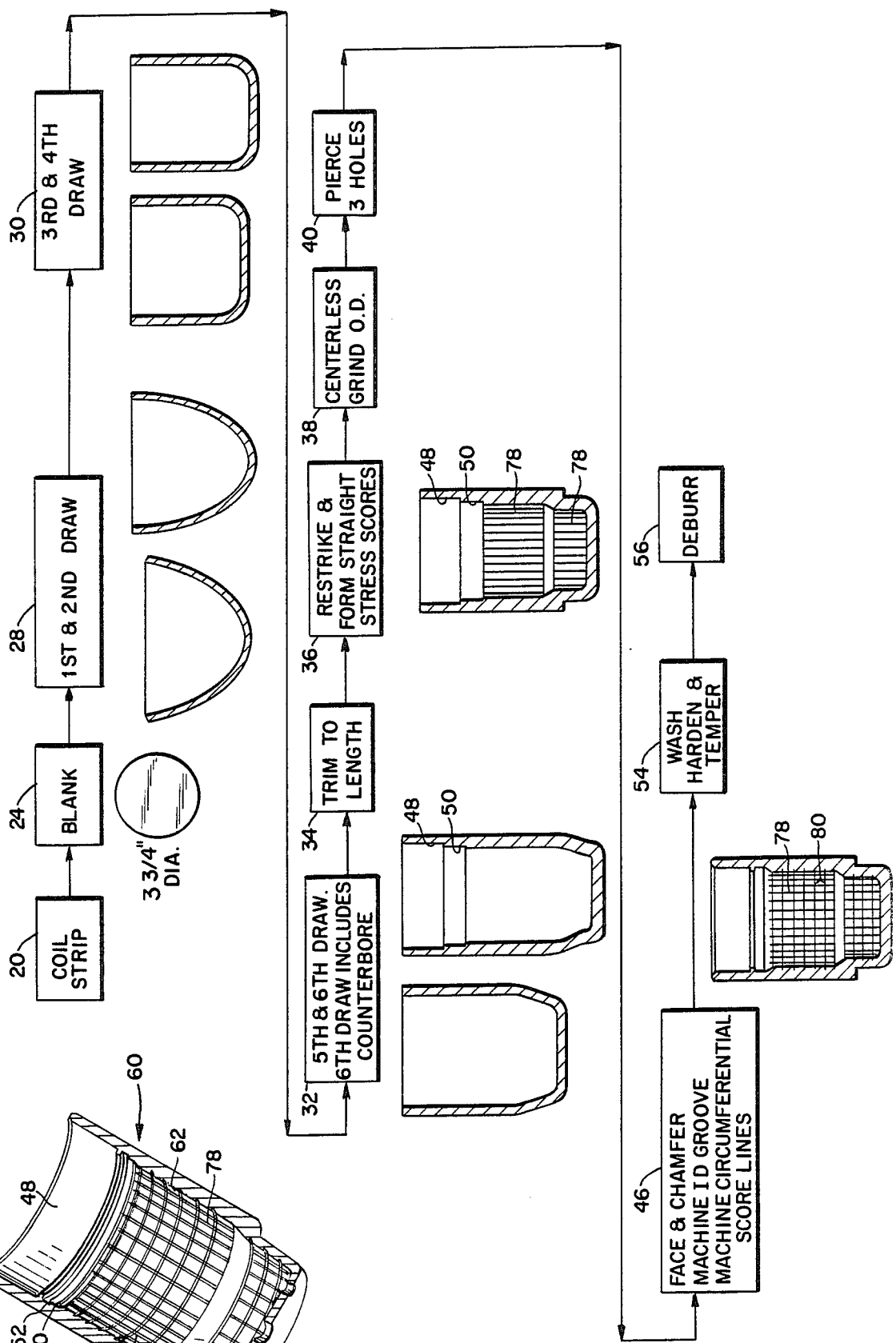
FIG. 4 is a block diagram illustrating the novel method of the invention by which the grenade body of FIG. 3 is manufactured.

The method of the invention illustrated in FIG. 4 overcomes the problems of the prior art and produces a grenade body 60 of FIG. 3 having a fragmentation grid pattern 62 of uniform depth and size. This is accomplished without requiring any significant physical equipment changes in the production line of FIG. 2 and without materially interrupting production schedules. In addition the grenade of FIG. 3 meets all military specifications that apply to the prior art grenade of FIG. 1.

Figure 6:
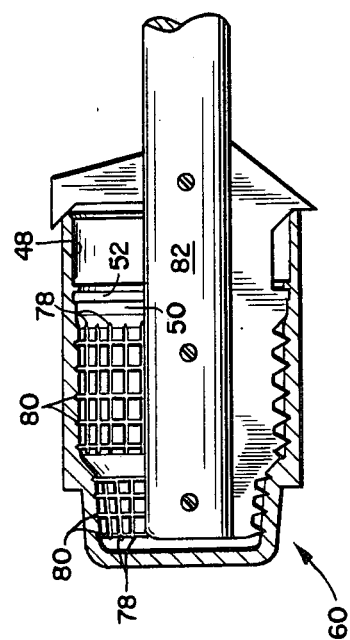
FIG. 6 is a generally perspective view of a machining tool by which the circumferential score lines are placed in the grenade body.
Figure 5:
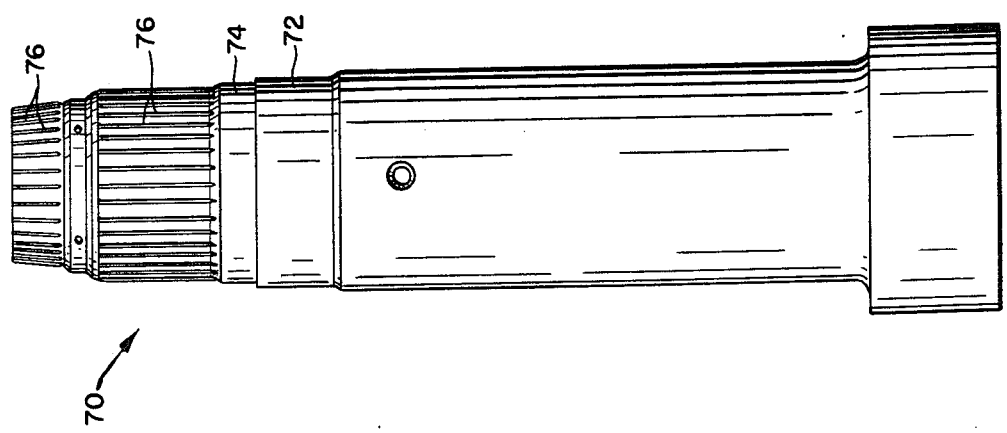
FIG. 5 is a generally perspective view of the novel fluted punch by which the straight score lines are coined into the grenade body.

As shown in FIG. 4, the metal strip from coil station 20 is fed to blanking station 24 where flat circular blanks 3¾ inches in diameter are cut. The plain unembossed blank is then processed through drawing stations 28, 30 and 32 where drawing operations through 5 are identical to those in FIG. 2. However, during the sixth draw, the punch and die assembly is modified to simultaneously form counterbores 48 and 50, thereby causing the metal which is normally removed by machining to be relocated and elongated in the longitudinal direction. This enables use of the 3¾ smaller diameter blank, and eliminates the need for subsequently machining the counterbores. The body is then trimmed to length and passed to the restrike station 36. As part of the invention, the restrike punch 70 (FIG. 5) employed at station 36 has been redesigned to include sections 72 and 74 for counterbores 48 and 50, and also to include a plurality of straight hardened cutting teeth or flutes 76. During the restrike operation, flutes 76 rapidly and simultaneously form a plurality of straight longitudinal score lines 78 of uniform depth within body 60. The body then passes onto grinding station 38, piercing station 40 and machining station 46. The six spindle machine at station 46 is simply retooled to face, chamfer and groove as in the prior method, but also to simultaneously cut a plurality of cirumferential stress score lines 80 of uniform depth which perpendicularly intersect lines 78 to form the uniform fragmentary grid pattern 62. A boring tool 82 for quickly and conveniently accomplishing this machining operation is shown in FIG. 6. The blank then passes to stations 54 and 56 as in the prior art.

The advantages of the method of the invention of FIG. 4 over the prior art method of FIG. 2 are now apparent. First, the very expensive roll embossing station 22 and annealing station 26 are eliminated. Second, forming the counterbores 48 and 50 simultaneously at the sixth draw operation reduces the required size of the blank from 4" diameter to 3¾" diameter. Third, by forming the fragmentation grid pattern 62 established by score lines 78 and 80 after the six drawing operations, the grid pattern in the finished body is of uniform size and depth and upon explosion produces maximum and predictable particle break-up. Fourth, no significant change is required in the production line equipment being used in the prior art method and no interruption in production is incurred. Fifth, the finished grenade body meets all current military design criteria. Sixth, all the above advantages are obtained while reducing the production cost per grenade, since the expensive roll embossing station is eliminated and the diameter of the blank and, therefor, the amount of material used is reduced.

Figure 7:
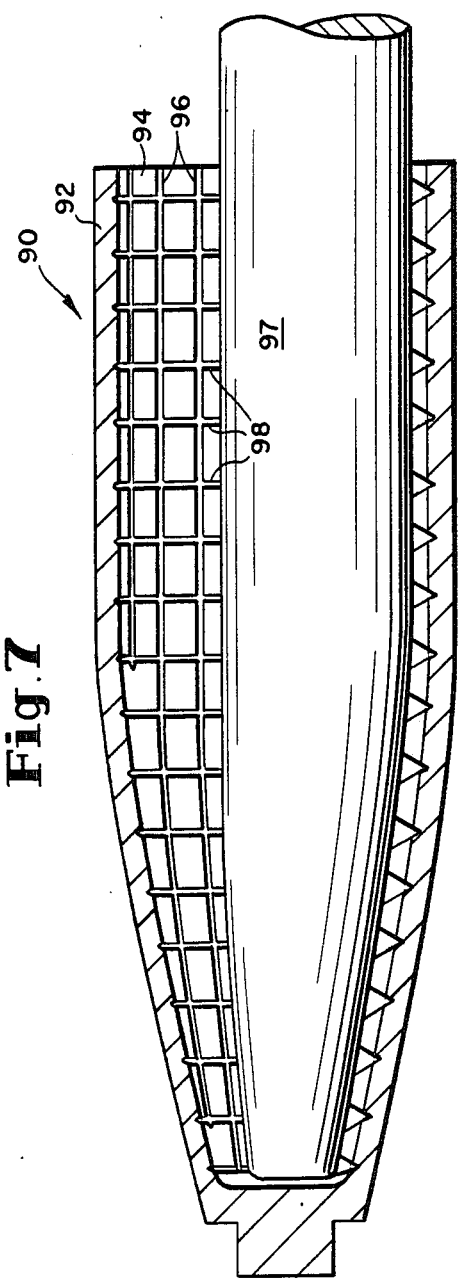
FIG. 7 is a cross sectional view generally illustrating an ogival projectile having a fragmentation pattern formed according to the method of the invention.
Figure 8:
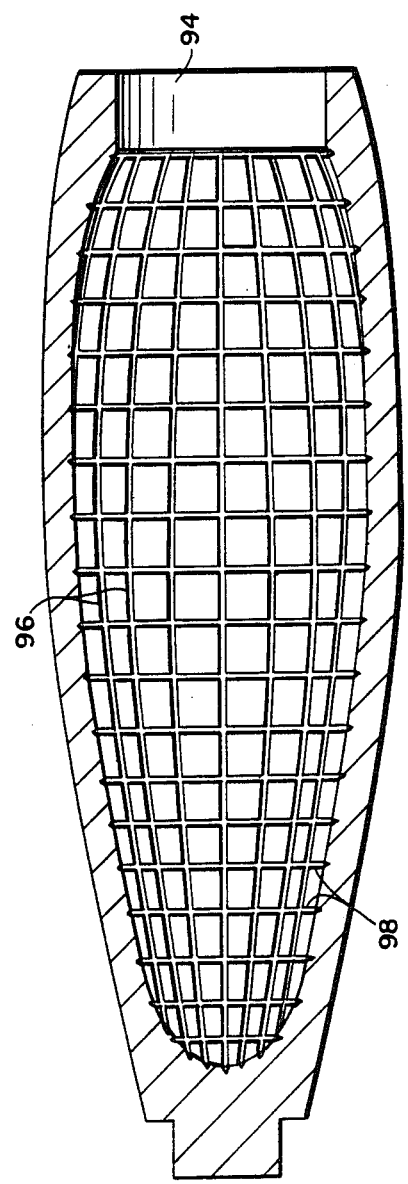
FIG. 8 is a sectional view of the ogival projectile of FIG. 7 following the final nose forming operation.

As discussed hereinabove, the invention is applicable to various type projectiles, and particularly to ogival projectiles such as the mortar projectile 90 shown in FIGS. 7 and 8. As with the grenade, the mortar body 92 is formed by a series of drawing operations to the general configuration of FIG. 7, with the nose end 94 remaining open. Again, the final fluted restrike punch will simultaneously form a plurality of longitudinal straight score lines 96 and a subsequent machining operation employing boring bar 97 will simultaneously form a plurality of circumferential score lines 98 perpendicularly intersecting lines 96. As shown in FIG. 8, nose portion 94 is then compressed to its ogival shape in readiness to accept an ogival shaped fuse assembly normally provided on mortars and other projectiles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of manufacturing a military projectile comprising providing a blank of material, drawing said blank into a hollow body of predetermined configuration, said body having an open end and a closed end, simultaneously forming through said open end a plurality of straight score lines on the internal wall of said hollow body, and forming a plurality of circumferential score lines on said internal wall which intersect said straight score lines, thereby establishing on said wall a fragmentation grid pattern of predetermined size and depth.

2. The method of claim 1 comprising a plurality of drawing steps for sequentially forming said blank into said body, said straight score lines being formed on said internal wall simultaneously with one of said drawing steps.

3. The method of claim 2, wherein said straight score lines are formed on said internal wall simultaneously with the last of said drawing steps.

4. The method of claim 2, wherein said projectile is a grenade body having a nose section, an intermediate generally cylindrical section, and a tail section having counterbore means extending from said cylindrical section, said counterbore means being formed simultaneously with one of said drawing steps and said straight score lines being formed on said intermediate section during a subsequent one of said drawing steps.

5. The method of claim 2, wherein said projectile is an ogival projectile.

6. The method of claim 5 wherein said open end is the nose end of said ogival projectile, further comprising compressing said nose end into its final ogival shape after said straight and circumferential score lines are formed on said wall.

* * * * *